United States Patent
Chen et al.

(10) Patent No.: US 9,608,695 B1
(45) Date of Patent: Mar. 28, 2017

(54) COMMUNICATION SYSTEM

(71) Applicant: TAIWAN SEMICONDUCTOR MANUFACTURING COMPANY, LTD., Hsinchu (TW)

(72) Inventors: Huan-Neng Chen, Taichung (TW); Chewn-Pu Jou, Hsinchu (TW); Feng Wei Kuo, Zhudong Township (TW); Lan-Chou Cho, Hsinchu (TW); William Wu Shen, Hsinchu (TW)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 0 days.

(21) Appl. No.: 15/007,515

(22) Filed: Jan. 27, 2016

(51) Int. Cl.
| | |
|---|---|
| H04B 3/50 | (2006.01) |
| H04L 25/49 | (2006.01) |
| H04B 1/04 | (2006.01) |
| H04B 1/16 | (2006.01) |
| H04L 27/36 | (2006.01) |
| H04L 27/38 | (2006.01) |

(52) U.S. Cl.
CPC ............... *H04B 3/50* (2013.01); *H04B 1/04* (2013.01); *H04B 1/16* (2013.01); *H04L 25/4902* (2013.01); *H04L 27/36* (2013.01); *H04L 27/38* (2013.01)

(58) Field of Classification Search
USPC ........................................................ 375/219
See application file for complete search history.

(56) References Cited

U.S. PATENT DOCUMENTS

| | | | | |
|---|---|---|---|---|
| 7,386,037 | B2* | 6/2008 | Miyoshi | H04B 3/32 375/219 |
| 8,279,008 | B2 | 10/2012 | Hsieh et al. | |
| 8,319,611 | B2* | 11/2012 | Tsukamoto | G06K 19/0713 340/10.34 |
| 8,427,240 | B2 | 4/2013 | Hsieh et al. | |
| 8,593,206 | B2 | 11/2013 | Chen et al. | |
| 8,610,494 | B1 | 12/2013 | Jin et al. | |
| 8,618,631 | B2 | 12/2013 | Jin et al. | |
| 9,261,538 | B2* | 2/2016 | Cojocaru | G01R 31/42 |
| 2011/0248797 | A1* | 10/2011 | Caloz | H01P 9/00 333/139 |
| 2012/0092230 | A1 | 4/2012 | Hung et al. | |
| 2013/0234305 | A1 | 9/2013 | Lin et al. | |
| 2014/0132333 | A1 | 5/2014 | Jin et al. | |
| 2014/0217546 | A1 | 8/2014 | Yen et al. | |
| 2014/0253262 | A1 | 9/2014 | Hsieh et al. | |
| 2014/0253391 | A1 | 9/2014 | Yen | |

\* cited by examiner

*Primary Examiner* — Eva Puente
(74) *Attorney, Agent, or Firm* — Hauptman Ham, LLP

(57) ABSTRACT

A communication system includes a transmitter, a first transmission line, and a second transmission line. The transmitter includes a modulation circuit, a carrier generator, and a pulse generator. The modulation circuit is configured to modulate a first data stream based on a first carrier signal, thereby generating a modulated signal. The carrier generator is configured to generate the first carrier signal and a reference clock signal. The pulse generator is configured to generate a pulse train signal based on the reference clock signal. The first transmission line is configured to carry the modulated signal. The second transmission line is configured to carry the pulse train signal.

20 Claims, 8 Drawing Sheets

COMMUNICATION SYSTEM

BACKGROUND

In an electrical system, there are many integrated circuit (IC) chips arranged in one or more IC packages or electrical devices, such as a memory, an analog-to-digital converter, wireless communication devices, or an application processor, in a chip. In some applications, data communication among different IC chips and/or different electrical devices are performed based on one or more communication protocols, such as Serial Peripheral Interface (SPI) protocol or Inter-Integrated Circuit (I$^2$C) protocol. As bandwidth requirement of the data communication among different IC chips and/or different electrical devices increases, various data communication protocols having a data rate faster than those of SPI or I$^2$C are being developed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
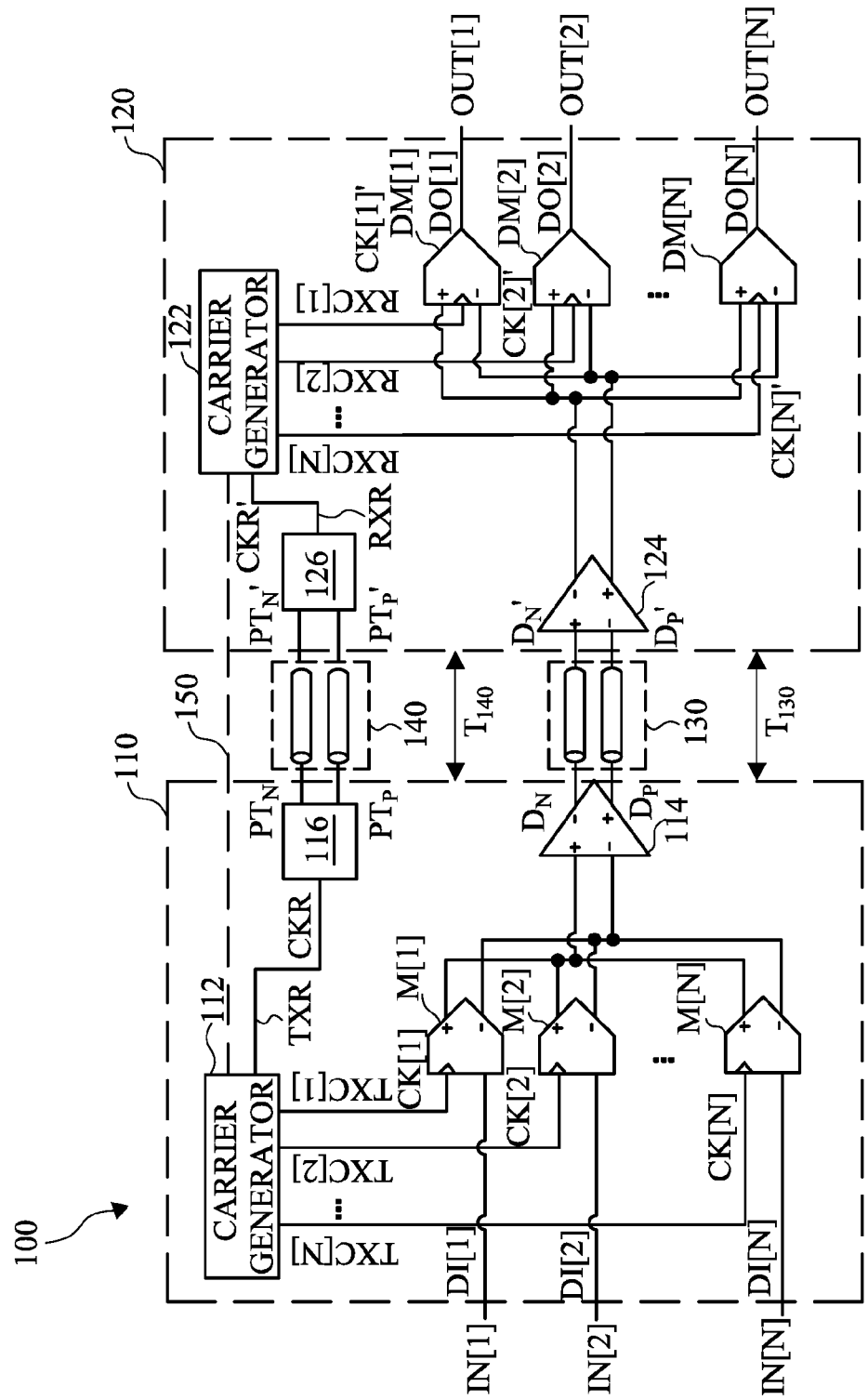
FIG. 1 is a block diagram of a data communication system, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In accordance with some embodiments, a reference clock signal is converted into a pulse train signal by a transmitter, the pulse train signal is transmitted to a receiver, and a re-generated reference clock signal is generated by the receiver based on the pulse train signal. A phase error when demodulating a received modulated signal by the receiver that is attributable to a delay between the transmitter and the receiver is preemptively compensated for based on the re-generated reference clock signal. In some embodiments, compared with a receiver not using the pulse train signal and the re-generated reference clock signal, the receiver according to the present disclosure consume less power by using a less complicated demodulator or having less correction iterations for compensating for the phase errors attributable to the delay between the transmitter and the receiver.

FIG. 1 is a block diagram of a data communication system 100, in accordance with some embodiments. Data communication system 100 includes a transmitter 110, a receiver 120, a first transmission line 130, and a second transmission line 140. Transmitter 110 and receiver 120 are electrically coupled through first transmission line 130 and second transmission line 140. In some embodiments, in addition to transmission lines 130 and 140, transmitter 110 and receiver 120 are electrically coupled through one or more physical or logic channels 150.

In some embodiments, transmitter 110 and receiver 120 are in different IC chips having different IC packages. In some embodiments, transmitter 110 and receiver 120 are in different IC chips within a common IC package. In some embodiments, transmitter 110 and receiver 120 are in different electrical devices of a common IC chip.

Transmitter 110 is coupled to N input data lines IN[1], IN[2], and IN[N], where N is a positive integer equal to or greater than 1. Each data line of input data lines IN[1], IN[2], and IN[N] is configured to carry a data stream DI[1], DI[2], or DI[N]. Transmitter 110 includes a carrier generator 112, N modulators M[1], M[2], and M[N], a driver amplifier 114, and a pulse generator 116.

Carrier generator 112 is configured to generate N carrier signals CK[1], CK[2], and CK[N] on corresponding carrier lines TXC[1], TXC[2], and TXC[N]. Each modulator of modulators M[1], M[2], and M[N] has a clock input terminal coupled with a corresponding carrier line of carrier lines TXC[1], TXC[2], and TXC[N] and a data terminal coupled with a corresponding data line of input data lines IN[1], IN[2], and IN[N]. Each modulator of modulators M[1], M[2], and M[N] output a modulated data stream to driver amplifier 114 in a form of a pair of differential signals. Driver amplifier 114 generate a modulated signal to be transmitted on transmission line 130 based on various modulated data streams from modulators M[1], M[2], and M[N]. Transmission line 130 includes two conductive lines suitable to transmit a signal in a differential mode. The modulated signal transmitted on transmission line 130 is also in a form of a pair of differential signals $D_P$ and $D_N$ at the output terminals of driver amplifier 114. In some embodiments, driver amplifier 114 is a low noise amplifier.

Carrier generator 112 is further configured to generate a reference clock signal CKR on a reference clock line TXR. The reference clock signal CKR has a reference clock frequency. The N carrier signals CK[1], CK[2], and CK[N] have N different carrier clock frequencies. In some embodiments, the reference clock frequency is less than any one of the N different carrier clock frequencies.

In some embodiments, transmission line 140 has a length. Reference clock frequency is set such that the length of transmission line 140 is equal to or less than 1/10 of an effective wavelength of an electrical signal on transmission line 140 at the reference clock frequency.

Pulse generator 116 is configured to receive the reference clock signal CKR through reference clock line TXR and is configured to generate a pulse train signal to be transmitted on transmission line 140 based on the reference clock signal CKR. Transmission line 140 includes two conductive lines suitable to transmit a signal in a differential mode. The pulse train signal transmitted on transmission line 140 is also in a form of a pair of differential signals $PT_P$ and $PT_N$.

Receiver 120 is coupled to transmission line 130, transmission line 140, and N output data lines OUT[1], OUT[2], and OUT[N]. Each data line of output data lines OUT[1], OUT[2], and OUT[N] is configured to carry a demodulated data stream DO[1], DO[2], or DO[N]. Receiver 120 includes a carrier generator 122, N demodulators DM[1], DM[2], and DM[N], a receiver amplifier 124, and a reference clock generator 126.

Receiver amplifier 124 is configured to receive a modulated signal transmitted on transmission line 130. The modulated signal received by receiver amplifier 124 from transmission line 130 is also in a form of a pair of differential signals $D_P'$ and $D_N'$ at the input terminals of receiver amplifier 124. Compared with the pair of differential signals $D_P$ and $D_N$, the pair of differential signals $D_P'$ and $D_N'$ have a delay $T_{130}$ and a channel distortion caused by transmission line 130. In some embodiments, receiver amplifier 124 is a low noise amplifier. Receiver amplifier 124 is also configured to output an amplified modulated signal to demodulators DM[1], DM[2], and DM[N].

Demodulators DM[1], DM[2], and DM[N] are coupled to receiver amplifier 124 to receive the amplified modulated signal and are coupled to carrier generator 122 through various carrier lines RXC[1], RXC[2], and RXC[N]. Each demodulator of demodulators DM[1], DM[2], and DM[N] output a demodulated data stream DO[1], DO[2], and DO[N] based on the amplified modulated signal from receiver amplifier 124 and carrier signals CK[1]', CK[2]', and CK[N]' on corresponding carrier lines RXC[ ], RXC[2], and RXC[N].

Carrier generator 122 is configured to receive a reference clock signal CKR' through a reference clock line RXR and to generate N carrier signals CK[1]', CK[2]', and CK[N]' based on reference clock signal CKR'. Each carrier signal of carrier signals CK[1]', CK[2]', and CK[N]' and a corresponding carrier signal of carrier signals CK[1], CK[2], and CK[N] have the same carrier clock frequency, or a difference thereof is within a predetermined engineering tolerance. In some embodiments, the predetermined engineering tolerance is less than 1.0% of the corresponding carrier clock frequency.

Reference clock generator 126 is configured to receive a pulse train signal transmitted on transmission line 140 and to generate reference clock signal CKR' on a reference clock line RXR. The pulse train signal received by reference clock generator 126 from transmission line 140 is also in a form of a pair of differential signals $PT_P'$ and $PT_N'$ at the input terminals of by reference clock generator 126. Compared with the pair of differential signals $PT_P$ and $PT_N$, the pair of differential signals $PT_P'$ and $PT_N'$ have a delay and a channel distortion caused by transmission line 140.

Reference clock signal CKR and reference clock signal CKR' have the same reference clock frequency, or a difference thereof is within a predetermined engineering tolerance. In some embodiments, the predetermined engineering tolerance is less than 0.0001% of the reference clock frequency. Moreover, compared with reference clock signal CKR, reference clock signal CKR' has a delay $T_{140}$ caused by transmission line 140 and a delay caused by pulse generator 116 and reference clock generator 126. In some embodiments, transmission line 140 is a duplication of transmission line 130. Accordingly, transmission line 140 is configured to cause delay $T_{140}$ that is the same as delay $T_{130}$ of transmission line 130 or a difference thereof is within a predetermined engineering tolerance. In some embodiments, the predetermined engineering tolerance is less than 1.0% of the delay $T_{130}$.

In some embodiments, transmission line 130 or transmission line 140 includes a pair of conductive lines that have a line width of 6 μm and are spaced apart by 6 μm. In some embodiments, transmission line 130 or transmission line 140 has an overall length of 1500 μm, which corresponds to a delay $T_{130}$ or delay $T_{140}$ of about 36.9 ps. In some embodiments, transmission line 130 or transmission line 140 has an overall length of 3000 μm, which corresponds to a delay $T_{130}$ or delay $T_{140}$ of about 54.4 ps. In some embodiments, transmission line 130 or transmission line 140 has an overall length of 4500 μm, which corresponds to a delay $T_{130}$ or delay $T_{140}$ of about 73.4 ps.

In some embodiments, carrier generator 122 includes a phase locked loop circuit configured to use the reference clock signal CKR' as an input reference signal of the phase locked loop circuit. In some embodiments, carrier generator 122 includes an injection locked oscillator configured to use the reference clock signal CKR' or a signal derived from signal $PT_P'$ or signal $PT_N'$ as an input locking signal of the injection locked oscillator. Therefore, carrier generator 122 generates carrier signals CK[1]', CK[2]', and CK[N]' with delay $T_{130}$ accounted for based on delay $T_{140}$ embedded in reference clock signal CKR'. A phase error between carrier signals CK[1]', CK[2]', and CK[N]' and the amplified modulated signal from receiver amplifier 124 that is attributable to the delay $T_{130}$ caused by transmission line 130 is thus preemptively compensated by carrier generator 122 based on the delay $T_{140}$ embedded in reference clock signal CKR'.

In some embodiments, carrier generator 112 and carrier generator 122 are coupled through channel 150 to exchange control information, sample carrier signals, or other carrier-related information. In some embodiments, channel 150 is a physical channel that includes one or more conductive lines. In some embodiments, channel 150 is a logic channel, and the actual electrical signals are exchanged through transmission line 130 or transmission line 140.

In some embodiments, each modulator of modulators M[1], M[2], and M[N] modulates the input data stream based on a Quadrature Amplitude Modulation (QAM) scheme having a predetermined number of constellation points. In some embodiments, the predetermined number of constellation points ranges from 64 to 1026. Demodulators DM[1], DM[2], and DM[N] are configured to match the modulation scheme of corresponding modulators M[1], M[2], and M[N]. In some embodiments, modulators M[1], M[2], and M[N] and corresponding demodulators DM[1], DM[2], and DM[N] are configured based on Phase Shift Keying (PSK) scheme or other suitable modulation schemes. In some embodiments, modulators M[1], M[2], and M[N] and corresponding demodulators DM[1], DM[2], and DM[N] are implemented to have two or more different modulation schemes or settings.

Figure 2:
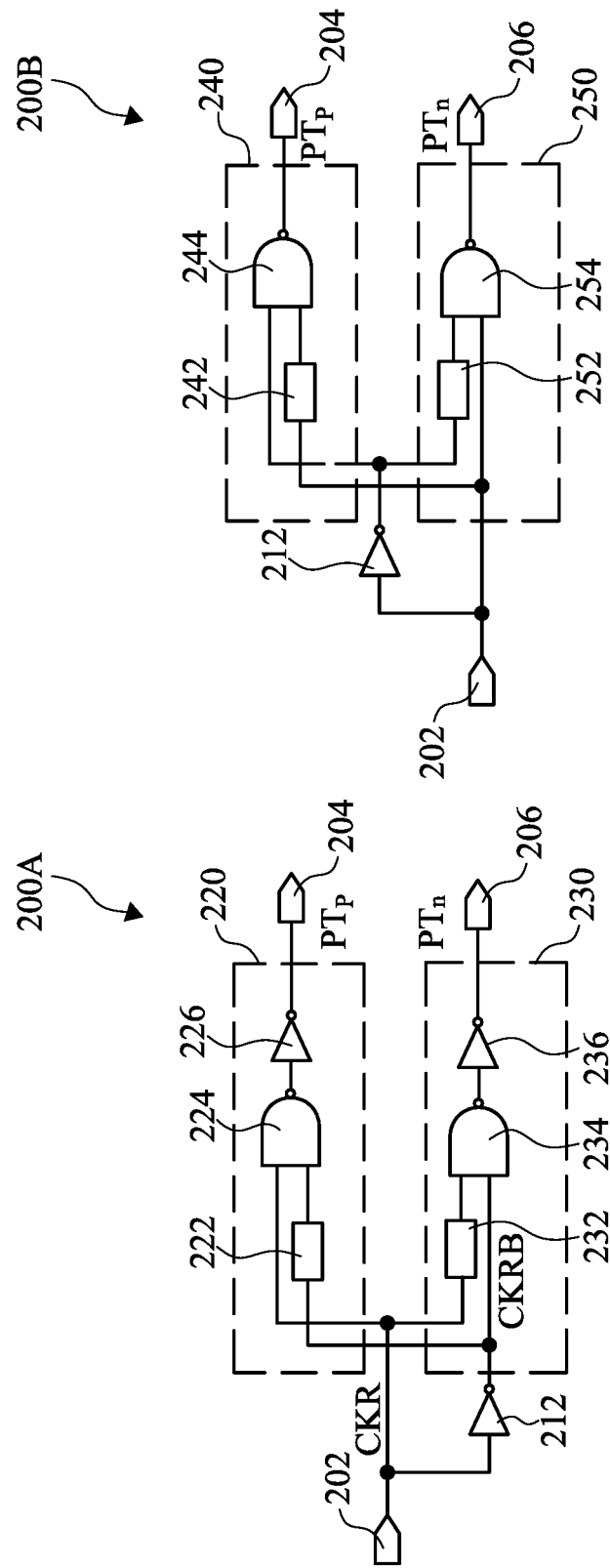
FIGS. 2A and 2B are circuit diagrams of example pulse generators usable in the data communication system in FIG. 1, in accordance with some embodiments.

FIG. 2A is a circuit diagram of an example pulse generator 200A usable in the data communication system 100 in FIG. 1, in accordance with some embodiments. Pulse generator 200A includes an input terminal 202, a first output terminal 204, and a second output terminal 206. Input terminal 202 is configured to receive reference clock signal CKR. First output terminal 204 is configured to output signal $PT_P$ of the pair of differential signals of the pulse train signal. Second output terminal 206 is configured to output signal $PT_N$ of the pair of differential signals of the pulse train signal.

Pulse generator 200A includes an inverter 212, a first sub circuit 220, and a second sub circuit 230. Inverter 212 is configured to receive reference clock signal CKR and to output an inverted reference clock signal CKRB. First sub circuit 220 is configured to receive reference clock signal CKR and inverted reference clock signal CKRB and to output signal $PT_P$, where signal $PT_P$ includes a first plurality of pulses generated based on rising edges of the reference clock signal CKR. Second sub circuit 230 is configured to receive reference clock signal CKR and inverted reference clock signal CKRB and to output signal $PT_P$, where signal $PT_P$ includes a first plurality of pulses generated based on rising edges of the reference clock signal CKR.

First sub circuit 220 includes a first delay circuit 222, a NAND gate 224, and an inverter 226. A first end of first delay circuit 222 is configured to receive inverted reference clock signal CKRB. A first input terminal of NAND gate 224 is configured to receive reference clock signal CKR. A second end of first delay circuit 222 is coupled with a second input terminal of NAND gate 224. An output terminal of NAND gate 224 is coupled with an input terminal of inverter 226. An output terminal of inverter 226 is coupled with output terminal 204. First delay circuit 222 is configured to cause a predetermined delay that corresponds to a pulse width of pulses of signal $PT_P$. In some embodiments, first delay circuit 222 includes a plurality of serially connected buffers or inverters. In some embodiments, first delay circuit 222 includes a resistance-capacitance network.

Second sub circuit 230 includes a second delay circuit 232, a NAND gate 234, and an inverter 236. A first end of second delay circuit 232 is configured to receive reference clock signal CKR. A first input terminal of NAND gate 234 is configured to receive inverted reference clock signal CKRB. A second end of second delay circuit 232 is coupled with a second input terminal of NAND gate 234. An output terminal of NAND gate 234 is coupled with an input terminal of inverter 236. An output terminal of inverter 236 is coupled with output terminal 206. Second delay circuit 232 is configured to cause a predetermined delay that corresponds to a pulse width of pulses of signal $PT_N$. In some embodiments, second delay circuit 232 includes a plurality of serially connected buffers or inverters. In some embodiments, second delay circuit 232 includes a resistance-capacitance network.

In some embodiments, first delay circuit 222 and second delay circuit 232 have a same circuit configuration.

FIG. 2B is a circuit diagram of another example pulse generator 200B usable in the data communication system 100 in FIG. 1, in accordance with some embodiments. Components in FIG. 2B that are the same or similar to those in FIG. 2A are given the same reference numbers, and detailed description thereof is thus omitted.

Compared with pulse generator 200A, pulse generator 200B replaces first sub circuit 220 and second sub circuit 230 with a different set of first sub circuit 240 and second sub circuit 250.

First sub circuit 240 includes a first delay circuit 242 and a NOR gate 244. A first end of first delay circuit 242 is configured to receive reference clock signal CKR. A first input terminal of NOR gate 244 is configured to receive inverted reference clock signal CKRB. A second end of first delay circuit 242 is coupled with a second input terminal of NOR gate 244. An output terminal of NOR gate 244 is coupled with output terminal 204. First delay circuit 242 is configured to cause a predetermined delay that corresponds to a pulse width of pulses of signal $PT_P$. In some embodiments, first delay circuit 242 includes a plurality of serially connected buffers or inverters. In some embodiments, first delay circuit 242 includes a resistance-capacitance network.

Second sub circuit 250 includes a second delay circuit 252 and a NOR gate 254. A first end of second delay circuit 252 is configured to receive inverted reference clock signal CKRB. A first input terminal of NOR gate 254 is configured to receive reference clock signal CKR. A second end of second delay circuit 252 is coupled with a second input terminal of NOR gate 254. An output terminal of NOR gate 254 is coupled with output terminal 206. Second delay circuit 252 is configured to cause a predetermined delay that corresponds to a pulse width of pulses of signal $PT_N$. In some embodiments, second delay circuit 252 includes a plurality of serially connected buffers or inverters. In some embodiments, second delay circuit 252 includes a resistance-capacitance network.

In some embodiments, first delay circuit 242 and second delay circuit 252 have a same circuit configuration.

Figure 4:
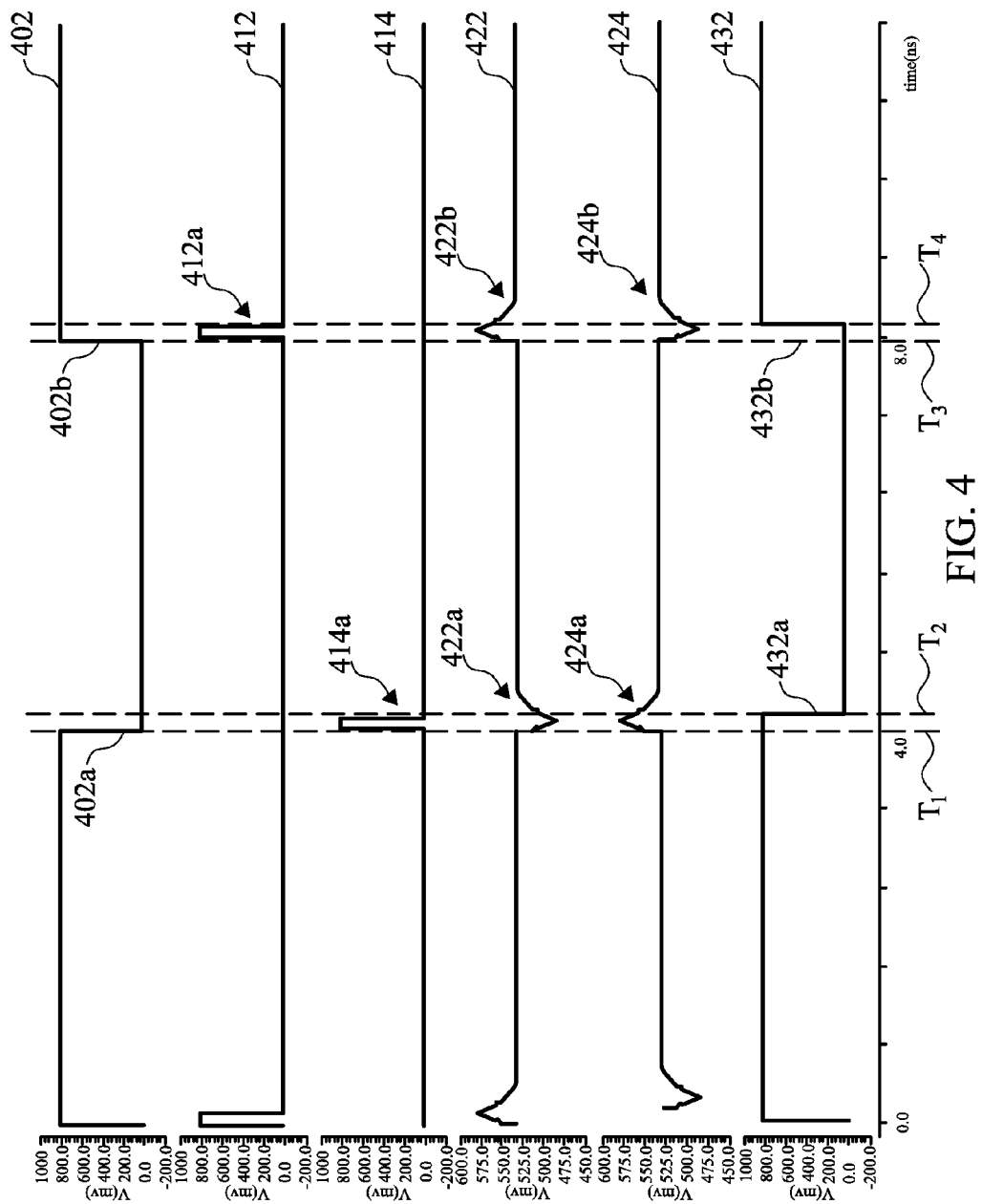
FIG. 4 is a timing diagram of signals at various nodes in FIG. 1, in accordance with some embodiments.

Pulse generator 200A and pulse generator 200B are two example implementations of pulse generator 116. Other suitable pulse generators that are suitable to generate pulses as illustrated in conjunction with FIG. 4 are within the scope of various embodiments.

Figure 3:
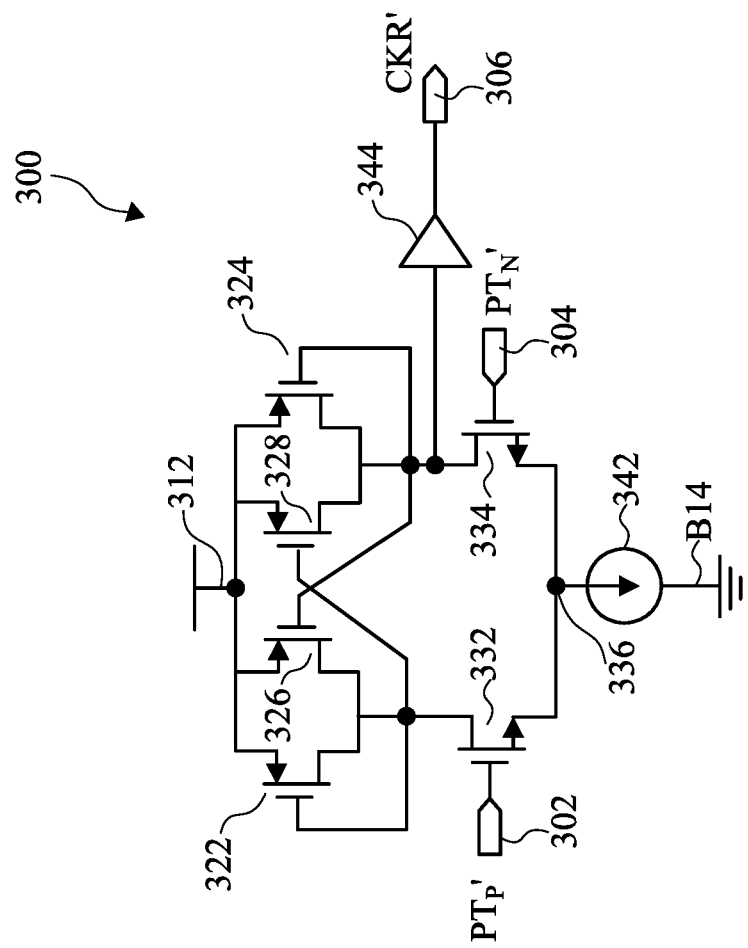
FIG. 3 is a circuit diagram of an example reference clock generator usable in the data communication system in FIG. 1, in accordance with some embodiments.

FIG. 3 is a circuit diagram of an example reference clock generator 300 usable in the data communication system 100 in FIG. 1, in accordance with some embodiments. Reference clock generator 300 includes a first input terminal 302, a second input terminal 304, and an output terminal 306. First input terminal 302 is configured to receive signal $PT_P'$ of the pair of differential signals from transmission line 140. Second input terminal 304 is configured to receive signal $PT_N'$ of the pair of differential signals from transmission line 140. Output terminal 306 is configured to output reference clock signal CKR'.

Reference clock generator 300 includes supply voltage node 312 configured to receive a supply voltage and a reference voltage node 314 configured to receive a reference voltage. In some embodiments, the supply voltage has a voltage level corresponding to a logic high value. In some embodiments, the reference voltage has a voltage level corresponding to a logic low value.

Reference clock generator 300 includes P-type transistors 322, 324, 326, and 328, N-type transistors 332 and 334, a current source 342, and a buffer 344. A source terminal of P-type transistor 322 is coupled with supply voltage node 312. A gate terminal and a drain terminal of P-type transistor 322 are coupled with each other. A source terminal of P-type transistor 324 is coupled with supply voltage node 312. A gate terminal and a drain terminal of P-type transistor 324 are coupled with each other and.

A source terminal of P-type transistor 326 is coupled with supply voltage node 312. A drain terminal of P-type transistor 326 is coupled with the drain terminal of P-type transistor 322. A gate terminal of P-type transistor 326 is coupled with the drain terminal of P-type transistor 324. A source terminal of P-type transistor 328 is coupled with supply voltage node 312. A drain terminal of P-type transistor 328 is coupled with the drain terminal of P-type transistor 324. A gate terminal of P-type transistor 328 is coupled with the drain terminal of P-type transistor 322.

A source terminal of N-type transistor 332 is coupled with a common node 336. A drain terminal of N-type transistor 332 is coupled with the drain terminal of P-type transistor 322. A gate terminal of N-type transistor 332 is coupled with input terminal 302. A source terminal of N-type transistor 334 is coupled with common node 336. A drain terminal of N-type transistor 334 is coupled with the drain terminal of P-type transistor 324. A gate terminal of N-type transistor 334 is coupled with input terminal 304. Current source 342 is coupled between common node 336 and reference voltage node 314. Current source 342 is configured to provide bias currents for transistors 322-328 and 332 and 334. In some embodiments, current source 342 includes one or more transistors having one or more corresponding gate terminals thereof biased at a predetermined set of bias voltages.

Buffer 344 has an input terminal coupled with the drain terminals of transistors 324, 328, and 334. Buffer 344 has an output terminal coupled with output terminal 306. In some embodiments, buffer 344 includes an even-number of serially-coupled inverters. In some embodiments, buffer 344 is configured to amplify the signal at the drain terminals of transistors 324, 328, and 334 to either the voltage level of the supply voltage or the voltage level of the reference voltage.

In operation, transistor 326 and 328 function as a latch to keep a voltage level at the drain terminals of transistors 324, 328, and 334 above or below a trip point voltage of buffer 344 when a voltage difference between signal $PT_P'$ and signal $PT_N'$ is about zero or less than a predetermined value. When the voltage different between signal $PT_P'$ and signal $PT_N'$ increases, transistors 322, 324, 332, and 334 function as a differential amplifier to amplify the voltage difference, and transistor 326 and 328 then further pull voltage level at the drain terminals of transistors 324, 328, and 334 to be above or below the trip point voltage of buffer 344 responsive to a signal polarity between signal $PT_P'$ and signal $PT_N'$.

Reference clock generator 300 is an example implementation of reference clock generator 126. Other suitable reference clock generators that are suitable to generate a reference clock signal as illustrated in conjunction with FIG. 4 are within the scope of various embodiments.

FIG. 4 is a timing diagram of signals at various nodes in FIG. 1, in accordance with some embodiments. Waveform 402 corresponds to the waveform of signal CKR. Waveform 412 corresponds to the waveform of signal $PT_P$. Waveform 414 corresponds to the waveform of signal $PT_N$. Waveform 422 corresponds to the waveform of signal $PT_P'$. Waveform 424 corresponds to the waveform of signal $PT_N'$. Waveform 432 corresponds to the waveform of signal CKR'.

At time $T_1$, reference clock signal CKR (waveform 402) has a falling edge 402a corresponding to transitioning from a voltage level corresponding to a logic high value (hereinafter the "logic high level") to a voltage level corresponding to a logic low value (hereinafter the "logic low level"). In response to falling edge 402a of reference clock signal CKR, pulse generator 116 causes signal $PT_N$ (waveform 414) to have a pulse 414a by setting signal $PT_N$ at the logic high level for a predetermined period of time. Signal $PT_P$ (waveform 412) remains at the logic low level.

At time $T_1$, signals $PT_P'$ (waveform 422) and $PT_N'$ (waveform 424) at input terminals of reference clock generator 126 are at a common mode voltage level determinable according to the configuration of reference clock generator 126. The pair of differential signals $PT_P$ and $PT_N$ then reach the input terminals of reference clock generator 126 as differential signals $PT_P'$ and $PT_N'$. The pulse 414a of signal $PT_N$ after the distortion and delay caused by transmission line 140 becomes pulse 422a of signal $PT_P'$ and pulse 424a of signal $PT_N'$.

At time $T_2$, a voltage difference between signal $PT_P'$ and signal $PT_N'$ is sufficient to cause reference clock generator 126 to pull reference clock signal CKR' (waveform 432) to have a falling edge corresponding to transitioning from the logic high level to the logic low level.

At time $T_3$, reference clock signal CKR (waveform 402) has a rising edge 402b corresponding to transitioning from the logic low level to the logic high level. In response to rising edge 402b of reference clock signal CKR, pulse generator 116 causes signal $PT_P$ (waveform 412) to have a pulse 412a by setting signal $PT_P$ at the logic high level for a predetermined period of time. Signal $PT_N$ (waveform 414) remains at the logic low level. The pulse 412a of signal $PT_P$ after the distortion and delay caused by transmission line 140 becomes pulse 422b of signal $PT_P'$ and pulse 424b of signal $PT_N'$.

At time $T_4$, a voltage difference between signal $PT_P'$ and signal $PT_N'$ is sufficient to cause reference clock generator 126 to pull reference clock signal CKR' (waveform 432) to have a rising edge corresponding to transitioning from the logic low level to the logic high level.

In some embodiments, a majority portion of a time delay $T_2-T_1$ or a time delay $T_4-T_3$ is attributable to time delay $T_{140}$ caused by transmission line 140. In some embodiments, transmission line 140 is a duplication of transmission line 130, and time delay $T_{140}$ is thus substantially the same as time delay $T_{130}$ caused by transmission line 130. Therefore, carrier signals CK[1]', CK[2]', and CK[N]' generated based on reference clock signal CKR' also include a delay sufficient to compensate time delay $T_{130}$. When demodulating the received modulated signal using carrier signals CK[1]', CK[2]', and CK[N]', phase errors that are attributable to time delay $T_{130}$ are already accounted for by the embedded delay of carrier signals CK[1]', CK[2]', and CK[N]'.

Figure 5:
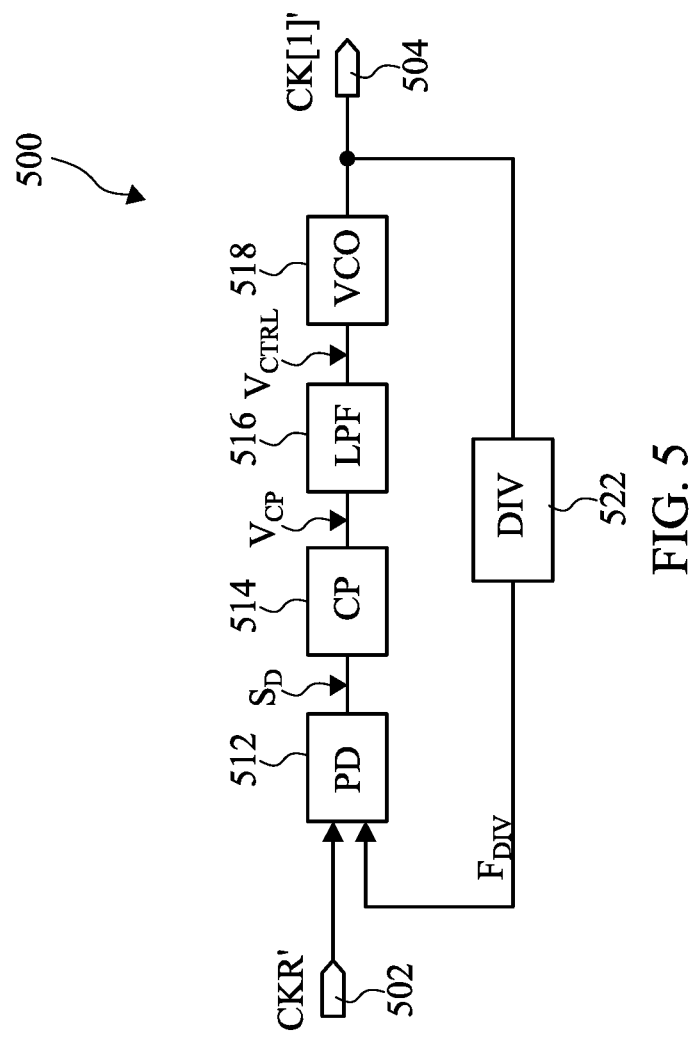
FIG. 5 is a block diagram of a phase locked loop circuit usable in the carrier generator in FIG. 1, in accordance with some embodiments.

FIG. 5 is a block diagram of a phase locked loop circuit 500 usable in the carrier generator 122 in FIG. 1, in accordance with some embodiments. Phase locked loop circuit 500 includes an input terminal 502 and an output terminal 504. Input terminal 502 is configured to receive reference clock signal CKR'. Output terminal 504 is configured to output a carrier signal, such as carrier signal CK[1]', for example. Carrier signal CK[1]' is generated by phase locked loop circuit 500 that is configured to use the reference clock signal CKR' as an input reference signal of the phase locked loop circuit 500.

Phase locked loop circuit 500 includes a phase detector 512, a charge pump 514, a low-pass filter 516, a voltage controlled oscillator 518, and a frequency divider 522. Phase detector 512 is configured to generate a detection signal $S_D$ based on a phase difference and/or a frequency difference between an input reference signal and a feedback signal $F_{DIV}$. In this embodiment, reference clock signal CKR' is used as the input reference signal. Charge pump 514 is configured to generate a pumped voltage $V_{CP}$ based on the detection signal $S_D$. Low-pass filter 516 is configured to generate a control signal $V_{CTRL}$ by low-pass filtering pumped voltage $V_{CP}$. Voltage controlled oscillator 518 is configured to generate carrier signal CK[1]' based on control signal $V_{CTRL}$. Frequency divider 522 is configured to generate feedback signal $F_{DIV}$ by frequency-dividing carrier signal CK[1]' by a predetermined ratio. In some embodiments, the predetermined dividing ratio is a positive integer. In some embodiments, the predetermined dividing ratio is a positive fractional number.

Phase locked loop circuit 500 is illustrated as an example. In some embodiments, a phase locked loop circuit having a configuration different from phase locked loop circuit 500 is within the scope of various embodiments, as long as the alternative phase locked loop circuit uses reference clock signal CKR' as its input reference signal. Also, carrier signal CK[1]' is used as an example. A phase lock loop circuit similar to phase locked loop circuit 500 is also usable to generate carrier signal CK[2]' or CK[N]'.

Figure 6:
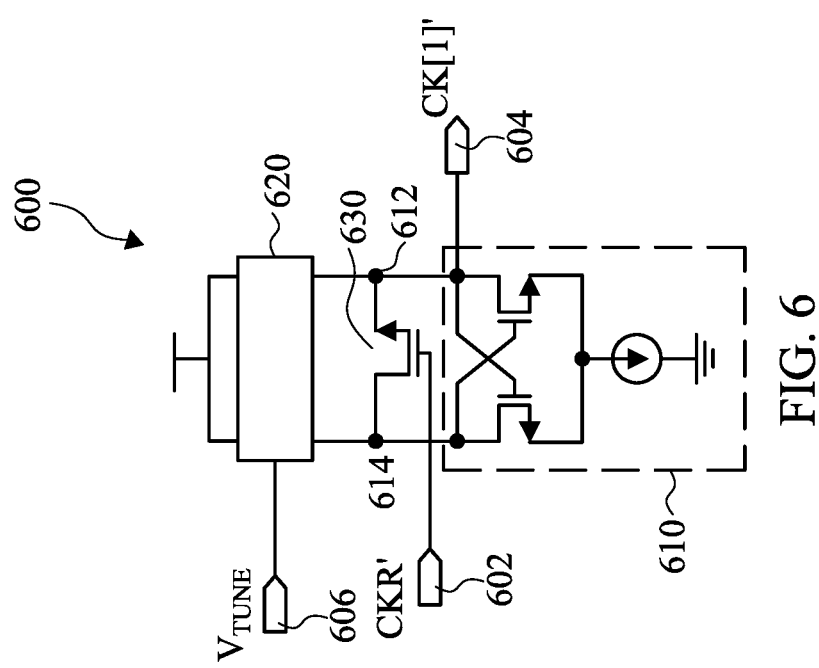
FIG. 6 is a circuit diagram of an injection locked oscillator usable in the carrier generator in FIG. 1, in accordance with some embodiments.

FIG. 6 is a circuit diagram of an injection locked oscillator 600 usable in the carrier generator 122 in FIG. 1, in accordance with some embodiments.

Injection locked oscillator 600 includes an input terminal 602, an output terminal 604, and a tuning terminal 606. Input terminal 602 is configured to receive reference clock signal CKR'. Output terminal 604 is configured to output a carrier signal, such as carrier signal CK[1]', for example. Tuning terminal 606 is configured to receive a tuning signal $V_{TUNE}$ for output frequency adjustment. Carrier signal CK[1]' is generated by injection locked oscillator 600 that is configured to use the reference clock signal CKR' as an input locking signal of the injection locked oscillator 600.

Injection locked oscillator 600 includes a differential amplifier 610 with a positive feedback configuration, an inductive-capacitive network 620, and a switching device 630. Differential amplifier 610 includes a first input/output node 612 and a second input/output node 614. First input/output node is coupled with output terminal 604. Inductive-capacitive network 620 is coupled with first input/output node 612 and second input/output node 614 and configured to receive tuning signal $V_{TUNE}$ from tuning terminal 606. In some embodiments, an inductance value of an inductive device and/or a capacitance value of a capacitive device of inductive-capacitive network 620 is adjustable based on tuning signal $V_{TUNE}$. As a result, an oscillating frequency of injection locked oscillator 600 (i.e., the carrier frequency of carrier signal CK[1]') is adjustable responsive to tuning signal $V_{TUNE}$.

Switching device 630 is coupled between first input/output node 612 and second input/output node 614 and is configured to force the voltage levels at first input/output node 612 and second input/output node 614 to a common voltage level. When switching device 630 is turned on, carrier signal CK[1]' is thus forced to be at a rising or a falling edge thereof. Therefore, the signal used to turn on or off switching device 630 is also referred as an input locking signal of injection locked oscillator 600. A phase of carrier signal CK[1]' is adjustable based on reference clock CLR'. In some embodiments, instead of using reference clock CLR', an amplified pulse signal based on signal $PT_P$' or signal $PT_N$' is used as the input locking signal.

Injection locked oscillator 600 is illustrated as an example. In some embodiments, an injection locked oscillator having a configuration different from injection locked oscillator 600 is within the scope of various embodiments, as long as the alternative injection locked oscillator 600 uses reference clock signal CKR' or pulse signals derived from signal $PT_P$' or signal $PT_N$' as its input locking signal. Also, carrier signal CK[1]' is used as an example. A injection locked oscillator similar to injection locked oscillator 600 is also usable to generate carrier signal CK[2]' or CK[N]'.

Figure 7:
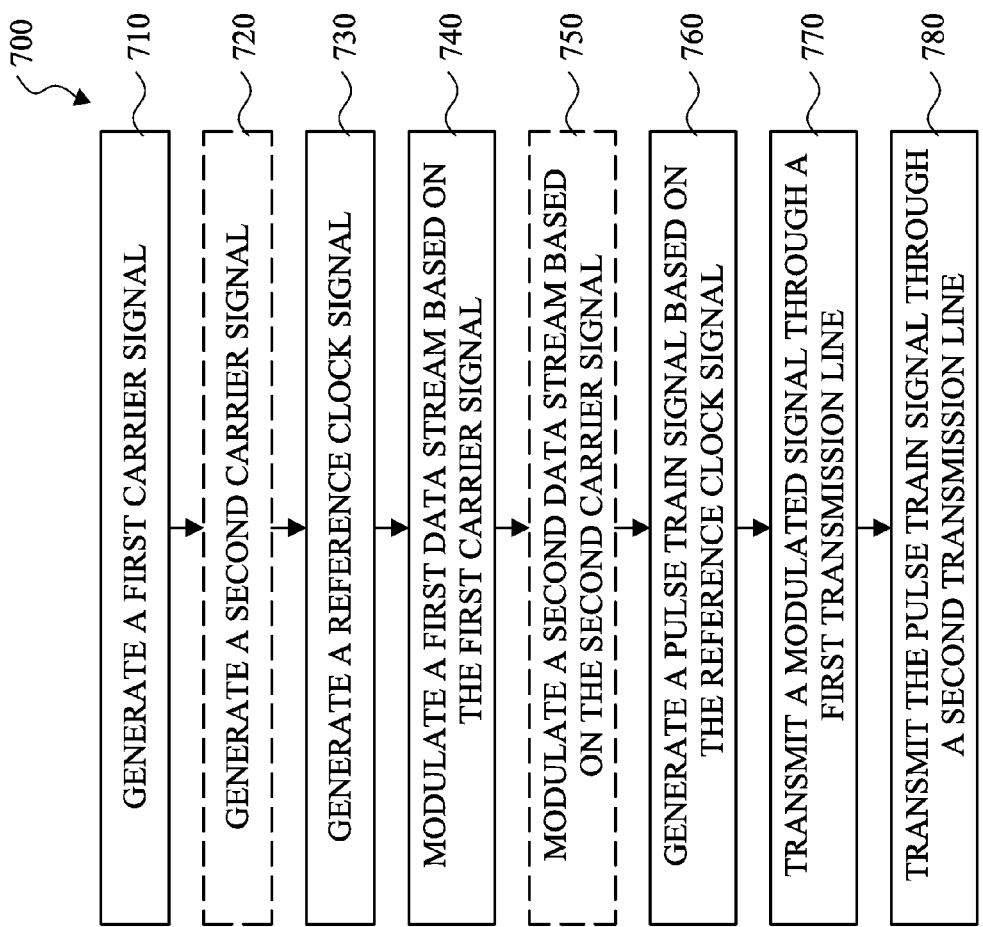
FIG. 7 is a flowchart of a method of data communication from a transmitter's perspective, in accordance with some embodiments.

FIG. 7 is a flowchart of a method 700 of data communication from a transmitter's perspective, in accordance with some embodiments. In some embodiments, method 700 is performed in conjunction with transmitter 110 and transmission lines 130 and 140 in FIG. 1. It is understood that additional operations may be performed before, during, and/or after the method 700 depicted in FIG. 7, and that some other processes may only be briefly described herein.

Method 700 begins with operation 710, where a first carrier signal CK[1] is generated by carrier generator 112. Method 700 proceeds to operation 720, where a second carrier signal CK[2] is generated by carrier generator 112. In some embodiments, when transmitter 110 only includes one modulators M[1] (i.e., N=1), operation 720 is omitted. In some embodiments, when transmitter 110 includes more than two modulators M[1] and M[2] (i.e., N>2), operation 710 and/or operation 720 is repeated to generate all corresponding carrier signals CK[1], CK[2], and CK[N].

Method 700 proceeds to operation 730, where a reference clock signal CKR is generated by carrier generator 112. In some embodiments, the first carrier signal CK[1] has a first carrier frequency, and the reference clock signal CKR has a reference clock frequency less than the first carrier frequency. In some embodiments, carrier signals CK[1], CK[2], and CK[N] have N different carrier clock frequencies, and the reference clock frequency is less than any one of the N different carrier clock frequencies.

Method 700 proceeds to operation 740, where a first data stream DI[1] is modulated by modulator M[1] based on the first carrier signal CK[1], thereby generating a first modulated data stream at the output terminals of modulator M[1]. Method 700 proceeds to operation 750, where a second data stream DI[2] is modulated by modulator M[2] based on the second carrier signal CK[2], thereby generating a second modulated data stream at the output terminals of modulator M[2]. In some embodiments, when transmitter 110 only includes one modulators M[1] (i.e., N=1), operation 750 is omitted. In some embodiments, when transmitter 110 includes more than two modulators M[1] and M[2] (i.e., N>2), operation 740 and/or operation 750 is repeated to generate all corresponding modulated data streams.

Method 700 proceeds to operation 760, where a pulse train signal is generated by pulse generator 116 based on the reference clock signal CKR. In this embodiment, the pulse train signal is in a form of a pair of differential signals $PT_P$ and $PT_N$. In some embodiments, pulse generator 116 generates signal $PT_P$ by generating a plurality of pulses based on rising edges of the reference clock signal CKR. In some embodiments, pulse generator 116 generates signal $PT_N$ by generating another plurality of pulses based on falling edges of the reference clock signal CKR.

Method 700 proceeds to operation 770, where a modulated signal is transmitted through a first transmission line 130. The modulated signal includes the first modulated data stream and/or the second modulated data stream. In this embodiment, the modulated signal is in a form of a pair of differential signals $D_P$ and $D_N$.

Method 700 proceeds to operation 780, where the pulse train signal $PT_P$/$PT_N$ is transmitted through a second transmission line 140.

In some embodiments, first transmission line 130 is configured to cause a delay $T_{130}$ to the modulated signal $D_P$/$D_N$, and second transmission line 140 is configured to cause a delay $T_{140}$ to the pulse train signal $PT_P'/PT_N'$. In some embodiments, the delay $T_{140}$ of the second transmission line 140 is usable to represent the delay $T_{130}$ of first transmission line 130.

Figure 8:
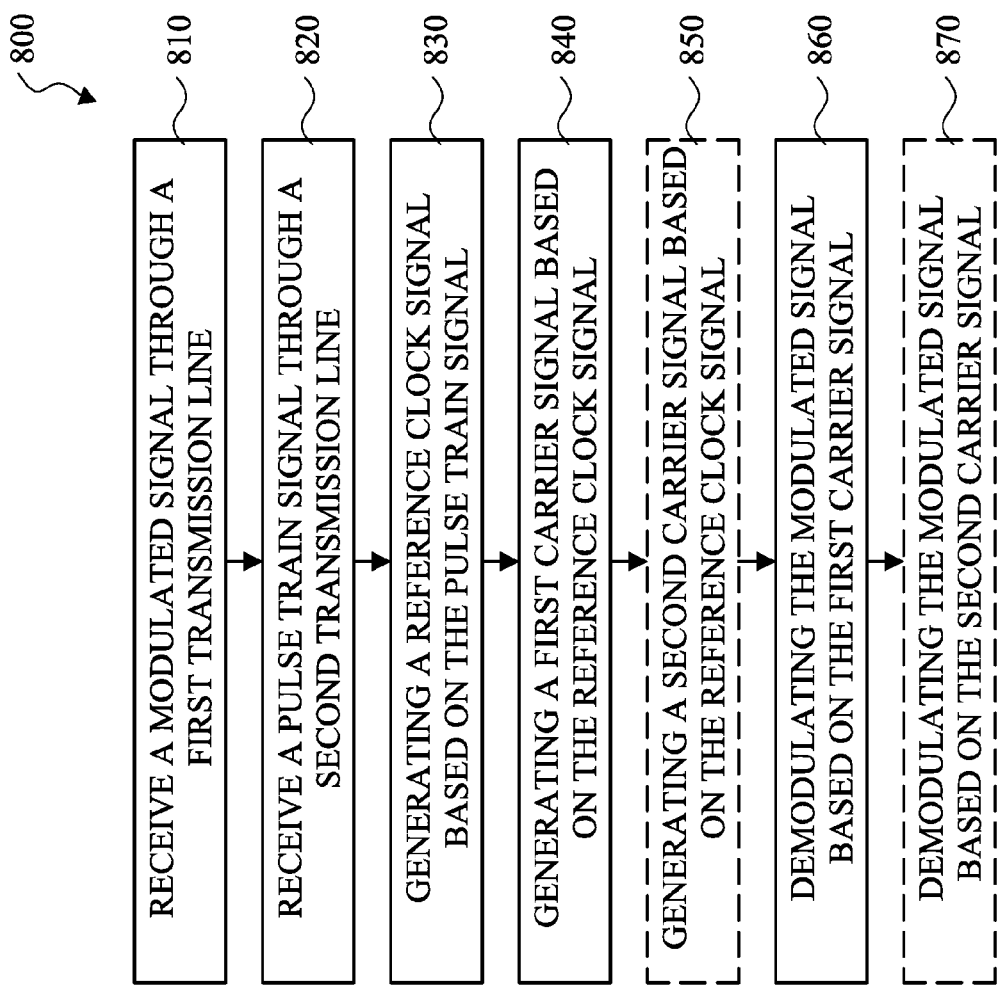
FIG. 8 is a flowchart of a method of data communication from a receiver's perspective, in accordance with some embodiments.

FIG. 8 is a flowchart of a method 800 of data communication from a receiver's perspective, in accordance with some embodiments. In some embodiments, method 800 is performed in conjunction with receiver 120 and transmission lines 130 and 140 in FIG. 1. It is understood that additional operations may be performed before, during, and/or after the method 800 depicted in FIG. 8, and that some other processes may only be briefly described herein.

Method 800 begins with operation 810, where a modulated signal is received through a first transmission line 130. In this embodiment, the modulated signal is in a form of a pair of differential signals $D_P'$ and $D_N'$. Also, in operation 820, a pulse train signal is received through a second transmission line 140. In this embodiment, the pulse train signal is in a form of a pair of differential signals $PT_P'$ and $PT_N'$.

In some embodiments, first transmission line 130 is configured to cause a delay $T_{130}$ to the modulated signal $D_P'/D_N'$ as compared with modulated signal $D_P/D_N$, and second transmission line 140 is configured to cause a delay $T_{140}$ to the pulse train signal $PT_P'/PT_N'$ as compared with pulse train signal $PT_P/PT_N$. In some embodiments, the delay $T_{140}$ of the second transmission line 140 is usable to represent the delay $T_{130}$ of first transmission line 130.

Method 800 proceeds to operation 830, where a reference clock signal CKR' is generated by reference clock generator 126 based on the pulse train signal $PT_P'/PT_N'$.

In some embodiments, reference clock generator 126 causes the reference clock signal CKR' to have a rising edge followed by a first voltage level corresponding to a logic high value responsive to a pulse of the pulse train signal that has a first signal polarity between the pair of differential signals $PT_P'/PT_N'$. In some embodiments, reference clock generator 126 causes the reference clock signal CKR' to have a falling edge followed by a second voltage level corresponding to a logic low value responsive to a pulse of the pulse train signal that has a second signal polarity between the pair of differential signals $PT_P'/PT_N'$. In some embodiments, the first signal polarity refers to a voltage level at signal $PT_P'$ is greater than a voltage level at signal $PT_N'$ by a predetermined threshold value. In some embodiments, the second signal polarity refers to the voltage level at signal $PT_N'$ is greater than the voltage level at signal $PT_P'$ by the predetermined threshold value.

Method 800 proceeds to operation 840, where a first carrier signal CK[1]' is generated by carrier generator 122. Method 800 proceeds to operation 850, where a second carrier signal CK[2]' is generated by carrier generator 122. In some embodiments, when receiver 120 only includes one demodulators DM[1] (i.e., N=1), operation 850 is omitted. In some embodiments, when receiver 120 includes more than two demodulators DM[1] and DM[2] (i.e., N>2), operation 840 and/or operation 850 is repeated to generate all corresponding carrier signals CK[1]', CK[2]', and CK[N]'.

In some embodiments, the first carrier signal CK[1]' has a first carrier frequency, and the reference clock signal CKR' has a reference clock frequency less than the first carrier frequency. In some embodiments, carrier signals CK[1]', CK[2]', and CK[N]' have N different carrier clock frequencies, and the reference clock frequency is less than any one of the N different carrier clock frequencies.

In some embodiments, a carrier signal CK[1]', CK[2]', or CK[N]' is generated by a phased locked loop circuit of the carrier generator using the reference clock signal CKR' as an input reference signal of the phase locked loop circuit. In some embodiments, a carrier signal CK[1]', CK[2]', or CK[N]' is generated by an injection locked oscillator of the carrier generator using the reference clock signal CKR' or pulse signals derived from signal $PT_P'$ or signal $PT_N'$ as an input locking signal of the injection locked oscillator.

In some embodiments, each carrier signal of carrier signals CK[1]', CK[2]', and CK[N]' and a corresponding carrier signal of carrier signals CK[1], CK[2], and CK[N] have the same carrier clock frequency, or a difference thereof is within a predetermined engineering tolerance. In some embodiments, the predetermined engineering tolerance is less than 1.0% of the corresponding carrier clock frequency.

Method 800 proceeds to operation 860, where the modulated signal is demodulated by demodulator DM[1] based on the first carrier signal CK[1]', thereby generating a first demodulated data stream DO[1]. Method 800 proceeds to operation 870, where the modulated signal is demodulated by demodulator DM[2] based on the second carrier signal CK[2]', thereby generating a second demodulated data stream DO[2]. In some embodiments, when receiver 120 only includes one demodulators DM[1] (i.e., N=1), operation 870 is omitted. In some embodiments, when receiver 120 includes more than two modulators DM[1] and DM[2] (i.e., N>2), operation 860 and/or operation 870 is repeated to generate all corresponding demodulated data streams.

In accordance with one embodiment, a communication system includes a transmitter, a first transmission line, and a second transmission line. The transmitter includes a modulation circuit, a carrier generator, and a pulse generator. The modulation circuit is configured to modulate a first data stream based on a first carrier signal, thereby generating a modulated signal. The first carrier signal has a first carrier frequency. The carrier generator is configured to generate the first carrier signal and a reference clock signal. The reference clock signal has a reference clock frequency less than the first carrier frequency. The pulse generator is configured to generate a pulse train signal based on the reference clock signal. The first transmission line is configured to carry the modulated signal. The first transmission line is configured to cause a delay to the modulated signal. The second transmission line is configured to carry the pulse train signal. The second transmission line is configured to cause a delay to the pulse train signal, and the delay of the second transmission line is usable to represent the delay of the first transmission line.

In accordance with another embodiment, a communication system includes a receiver, a first transmission line, and a second transmission line. The receiver includes a demodulation circuit, a carrier generator, and a reference clock generator. The demodulation circuit is configured to demodulate a modulated signal based on a first carrier signal. The first carrier signal has a first carrier frequency. The carrier generator is configured to generate the first carrier signal based on a reference clock signal. The reference clock signal has a reference clock frequency less than the first carrier frequency. The reference clock generator is configured to generate the reference clock signal based on a pulse train signal. The first transmission line is configured to carry the modulated signal. The first transmission line is configured to cause a delay to the modulated signal. The second transmission line is configured to carry the pulse train signal. The second transmission line is configured to cause a delay to the pulse train signal, and the delay of the second transmission line is usable to represent the delay of the first transmission line.

In accordance with another embodiment, a method of data communication includes generating a first carrier signal and a reference clock signal. The first carrier signal has a first carrier frequency, and the reference clock signal has a reference clock frequency less than the first carrier frequency. A first data stream is modulated based on the first carrier signal, thereby generating a first modulated data stream. A pulse train signal is generated based on the reference clock signal. A modulated signal is transmitted through a first transmission line. The modulated signal includes the first modulated data stream, and the first transmission line is configured to cause a delay to the modulated signal. The pulse train signal is transmitted through a second transmission line. The second transmission line is configured to cause a delay to the pulse train signal, and the delay of the second transmission line is usable to represent the delay of the first transmission line.

In accordance with another embodiment, a method of data communication includes receiving a modulated signal through a first transmission line. The first transmission line is configured to cause a delay to the modulated signal. A pulse train signal is received through a second transmission line. The second transmission line is configured to cause a delay to the pulse train signal, and the delay of the second transmission line is usable to represent the delay of the first transmission line. A reference clock signal is generated based on the pulse train signal. A first carrier signal is generated based on the reference clock signal. The first carrier signal has a first carrier frequency, and the reference clock signal has a reference clock frequency less than the first carrier frequency. The modulated signal is demodulated based on the first carrier signal, thereby generating a first demodulated data stream.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A communication system, comprising:
   a transmitter, comprising:
      a modulation circuit configured to modulate a first data stream based on a first carrier signal, thereby generating a modulated signal, the first carrier signal having a first carrier frequency;
      a carrier generator configured to generate the first carrier signal and a reference clock signal, the reference clock signal having a reference clock frequency less than the first carrier frequency; and
      a pulse generator configured to generate a pulse train signal based on the reference clock signal;
   a first transmission line configured to carry the modulated signal, the first transmission line being configured to cause a delay to the modulated signal; and
   a second transmission line configured to carry the pulse train signal, the second transmission line being configured to cause a delay to the pulse train signal.

2. The communication system of claim 1, wherein
   the first transmission line has a pair of conductive lines, and the modulated signal is transmitted on the first transmission line as a first pair of differential signals; and
   the second transmission line has a pair of conductive lines, and the pulse train signal is transmitted on the second transmission line as a second pair of differential signals.

3. The communication system of claim 1, wherein the modulation circuit comprises:
   a first modulator configured to generate a first modulated signal based on the first data stream and the first carrier signal; and
   a driver amplifier configured to generate the modulated signal based on the first modulated signal.

4. The communication system of claim 3, wherein
   the modulation circuit further comprises a second modulator configured to generate a second modulated signal based on a second data stream and a second carrier signal, the second carrier signal having a second carrier frequency, and the reference clock frequency is less than the second carrier frequency; and
   the driver amplifier is further configured to generate the modulated signal based on the first modulated signal and the second modulated signal.

5. The communication system of claim 1, wherein the second transmission line has a length equal to or less than 1/10 of an effective wavelength of an electrical signal on the second transmission line at the reference clock frequency.

6. The communication system of claim 1, wherein
   the pulse train signal is generated by the pulse generator in a form of a pair of differential signals; and
   the pulse generator comprises:
      a first sub circuit configured to generate a first signal of the pair of differential signals, the first signal comprising a first plurality of pulses generated based on rising edges of the reference clock signal; and
      a second sub circuit configured to generate a second signal of the pair of differential signals, the second signal comprising a second plurality of pulses generated based on falling edges of the reference clock signal.

7. A communication system, comprising:
   a receiver, comprising:
      a demodulation circuit configured to demodulate a modulated signal based on a first carrier signal, the first carrier signal having a first carrier frequency;
      a carrier generator configured to generate the first carrier signal based on a reference clock signal, the reference clock signal having a reference clock frequency less than the first carrier frequency; and
      a reference clock generator configured to generate the reference clock signal based on a pulse train signal;
   a first transmission line configured to carry the modulated signal, the first transmission line being configured to cause a delay to the modulated signal; and
   a second transmission line configured to carry the pulse train signal, the second transmission line being configured to cause a delay to the pulse train signal.

8. The communication system of claim 7, wherein
the first transmission line has a pair of conductive lines, and the modulated signal is transmitted on the first transmission line as a first pair of differential signals; and
the second transmission line has a pair of conductive lines, and the pulse train signal is transmitted on the second transmission line as a second pair of differential signals.

9. The communication system of claim 7, wherein the demodulation circuit comprises:
a receiver amplifier configured to generate an amplified modulated signal based on the modulated signal; and
a first demodulator configured to generate a first demodulated data stream based on the amplified modulated signal and the first carrier signal.

10. The communication system of claim 9, wherein the demodulation circuit further comprises a second demodulator configured to generate a second demodulated data stream based on the amplified modulated signal and a second carrier signal, the second carrier signal having a second carrier frequency, and the reference clock frequency being less than the second carrier frequency.

11. The communication system of claim 7, wherein the second transmission line has a length equal to or less than 1/10 of an effective wavelength of an electrical signal on the second transmission line at the reference clock frequency.

12. The communication system of claim 7, wherein
the pulse train signal is transmitted on the second transmission line in a form of a pair of differential signals; and
the reference clock generator comprises a latch amplifier having a first input terminal, a second input terminal, and an output terminal, the first input terminal being configured to receive a first signal of the pair of differential signals, the second input terminal being configured to receive a second signal of the pair of differential signals, and the output terminal being configured to output the reference clock signal.

13. The communication system of claim 7, wherein the carrier generator has one of the following configurations:
the carrier generator comprising a phase locked loop circuit configured to use the reference clock signal as an input reference signal of the phase locked loop circuit; or
the carrier generator comprising an injection locked oscillator configured to use the reference clock signal as an input locking signal of the injection locked oscillator.

14. A method of data communication, comprising:
generating a first carrier signal and a reference clock signal, the first carrier signal having a first carrier frequency, and the reference clock signal having a reference clock frequency less than the first carrier frequency;
modulating a first data stream based on the first carrier signal, thereby generating a first modulated data stream;
generating a pulse train signal based on the reference clock signal;
transmitting a modulated signal through a first transmission line, the modulated signal comprising the first modulated data stream, the first transmission line being configured to cause a delay to the modulated signal; and
transmitting the pulse train signal through a second transmission line, the second transmission line being configured to cause a delay to the pulse train signal.

15. The method of data communication of claim 14, wherein
the pulse train signal is generated in a form of a pair of differential signals; and
the generating the pulse train signal comprises:
generating a first signal of the pair of differential signals, comprising generating a first plurality of pulses based on rising edges of the reference clock signal; and
generating a second signal of the pair of differential signals, comprising generating a second plurality of pulses based on falling edges of the reference clock signal.

16. The method of data communication of claim 14, further comprising:
generating a second carrier signal, the second carrier signal having a second carrier frequency, and the reference clock frequency being less than the second carrier frequency;
modulating a second data stream based on the second carrier signal, thereby generating a second modulated data stream, the modulated signal further including the second modulated data stream.

17. A method of data communication, comprising:
receiving a modulated signal through a first transmission line, the first transmission line being configured to cause a delay to the modulated signal;
receiving a pulse train signal through a second transmission line, the second transmission line being configured to cause a delay to the pulse train signal;
generating a reference clock signal based on the pulse train signal;
generating a first carrier signal based on the reference clock signal, the first carrier signal having a first carrier frequency, and the reference clock signal having a reference clock frequency less than the first carrier frequency; and
demodulating the modulated signal based on the first carrier signal, thereby generating a first demodulated data stream.

18. The method of data communication of claim 17, wherein
the pulse train signal is transmitted in a form of a pair of differential signals; and
the generating the reference clock signal comprises:
causing the reference clock signal to have a rising edge followed by a first voltage level corresponding to a logic high value responsive to a first pulse of the pulse train signal that has a first signal polarity between the pair of differential signals; and
causing the reference clock signal to have a falling edge followed by a second voltage level corresponding to a logic low value responsive to a second pulse of the pulse train signal that has a second signal polarity between the pair of differential signals.

19. The method of data communication of claim 17, further comprising:
generating a second carrier signal based on the reference clock signal, the second carrier signal having a second carrier frequency, and the reference clock frequency being less than the second carrier frequency; and
demodulating the modulated signal based on the second carrier signal, thereby generating a second demodulated data stream.

20. The method of data communication of claim 17, wherein generating the first carrier signal comprises one of the following operations:

generating the first carrier signal by a phase locked loop circuit, the phase locked loop circuit being configured to use the reference clock signal as an input reference signal of the phase locked loop circuit; or generating the first carrier signal by an injection locked oscillator, the injection locked oscillator being configured to use the reference clock signal as an input locking signal of the injection locked oscillator.

* * * * *